(12) United States Patent
Kishore et al.

(10) Patent No.: US 11,574,275 B2
(45) Date of Patent: Feb. 7, 2023

(54) METHOD AND A SYSTEM FOR IDENTIFYING SENTIMENTS OF EMPLOYEE TOWARDS AN ORGANIZATION

(71) Applicant: Zensar Technologies Limited, Maharashtra (IN)

(72) Inventors: Sandeep Kishore, Fremont, CA (US); Hari Eswar S M, Pune (IN); Aishwarya Chaurasia, Pune (IN); Richa Sawhney, Pune (IN); Shree Krishna Somani, Pune (IN)

(73) Assignee: Zensar Technologies Limited, Pune (IN)

( * ) Notice: Subject to any disclaimer, the term of this patent is extended or adjusted under 35 U.S.C. 154(b) by 0 days.

(21) Appl. No.: 17/125,358

(22) Filed: Dec. 17, 2020

(65) Prior Publication Data
US 2021/0192418 A1    Jun. 24, 2021

(30) Foreign Application Priority Data
Dec. 20, 2019   (IN) .............................. 201921053186

(51) Int. Cl.
*G06Q 10/06* (2012.01)
*G06F 40/10* (2020.01)
(Continued)

(52) U.S. Cl.
CPC ....... *G06Q 10/06398* (2013.01); *G06F 17/16* (2013.01); *G06F 40/10* (2020.01);
(Continued)

(58) Field of Classification Search
CPC ........ G06Q 10/06393; G06Q 10/06398; G06F 40/30; G06F 16/3344; G06F 40/20
See application file for complete search history.

(56) References Cited

U.S. PATENT DOCUMENTS 11,170,172 B1 * 11/2021 Robertson ............... G06F 16/61
2015/0269244 A1    9/2015 Qamar et al.
(Continued)

OTHER PUBLICATIONS

Maurya, Abhinav; Leman Akoglu, Ramayya Krishnan. A Lens into Employee Pee Reviews via Sentiment-Aspect Modeling. IEEE/ACM International Conference on Advances in Social Networks Analysis and Mining. (Year: 2018).*
(Continued)

*Primary Examiner* — Johnna R Loftis
(74) *Attorney, Agent, or Firm* — Hamre, Schumann, Mueller & Larson, P.C.

(57) ABSTRACT

A method and system for determining sentiment of an employee towards an organization comprises extracting structured and unstructured data from one or more structured data sources comprising structured datapoints and one or more unstructured data sources comprising unstructured datapoints. The method comprises building regression model on the plurality of structured datapoints to determine a relationship of structured datapoints amongst the structured datapoints, creating a first profile of the employee based on said relationship, creating a second profile of the employee by selecting one or more words from each unstructured datapoints by using a prestored vocabulary, assigning one or more scores, corresponding to said words, in context of corresponding each of the unstructured datapoints. Method comprises generating a matrix based on the first profile and the second profile indicating sentiments of employee towards organization.

16 Claims, 4 Drawing Sheets

(51) Int. Cl.
    *G06Q 10/10*     (2012.01)
    *G06F 17/16*     (2006.01)
    *G06F 40/44*     (2020.01)

(52) U.S. Cl.
    CPC ....... *G06F 40/44* (2020.01); *G06Q 10/06312* (2013.01); *G06Q 10/105* (2013.01)

(56) References Cited

U.S. PATENT DOCUMENTS

| | | | |
|---|---|---|---|
| 2016/0196511 A1* | 7/2016 | Anisingaraju | G06Q 50/01 705/7.11 |
| 2019/0095843 A1 | 3/2019 | Muthuswamy | |
| 2019/0244152 A1* | 8/2019 | Yan | G06N 20/00 |
| 2021/0241327 A1* | 8/2021 | Childress | G06Q 10/06398 |

OTHER PUBLICATIONS

S. Rady, "A business intelligent technique for sentiment estimation by management sectors," 2015 IEEE Seventh International Conference on Intelligent Computing and Information Systems (ICICIS), 2015, pp. 370-376, doi: 10.1109/IntelCIS.2015.7397247. (Year: 2015).*

Bajpai, R., Hazarika, D., Singh, K., Gorantla, S., Cambria, E., Zimmermann, R. Aspect-Sentiment Embeddings for Company Profiling and Employee Opinion Mining. (Year: 2019).*

Rady, Sherine. A Business Intelligent Technique for Sentiment Estimation by Management Sectors. IEEE 2015 (Year: 2015).*

\* cited by examiner

METHOD AND A SYSTEM FOR IDENTIFYING SENTIMENTS OF EMPLOYEE TOWARDS AN ORGANIZATION

TECHNICAL FIELD

The present disclosure relates to a field of sentiment analysis and more particularly, to a method and system for determining sentiments of the employee comprising satisfaction or dissatisfaction towards an organization.

BACKGROUND OF THE INVENTION

Retaining talented employees is of utmost important for an organization for business success. An organization uses various methods for retaining employee, for example, but not limited to, providing financial benefits, trainings, counselling sessions, etc. However, most of these methods are generally offered when the employee plans to leave the organization by accepting an offer in some other organization. Retaining the employees becomes difficult at that stage. Additionally, the costs of recruiting and training new employees to replace the existing ones have a significant financial impact on a business.

The attrition rate of the employee can be prevented by identifying if the employee is dissatisfied. To achieve the aforementioned objective, organizations analyse data relating to satisfaction of the employee within the organization. However, organizations in that merely rely on performance data of the employee rather than behaviour and/or sentiment of the employee towards their employer, due to unavailability of behaviour and/or sentiment data. Even if the behaviour and/or sentiment data is available, there aren't any means exists to analyse the behaviour and/or sentiment data relative to the performance data to understand the employee's feelings towards the organization.

Thus, there is required one or more techniques which helps the organization to identify whether the employee is satisfaction towards the organization and thereby proactively guiding the organization to take corrective measures to minimize the attrition rate.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

The present disclosure overcomes one or more shortcomings of the prior art and provides additional advantages discussed throughout the present disclosure. Additional features and advantages are realized through the techniques of the present disclosure. Other embodiments and aspects of the disclosure are described in detail herein and are considered a part of the claimed disclosure.

In one embodiment of the present disclosure, a method for determining sentiment of an employee towards an organization is disclosed. The method comprises the step of extracting structured data and unstructured data from one or more structured data sources and one or more unstructured data sources respectively, wherein the one or more structured and unstructured data sources are associated with the organization, and wherein the structured data comprise a plurality of structured datapoints, and wherein the unstructured data comprise a plurality of unstructured datapoints in a textual format. The method further comprises building a regression model on the plurality of structured datapoints of the structured data to determine a relationship of structured datapoints amongst the plurality of structured datapoints. The method further comprises creating a first profile of the employee based on the relationship determined amongst the plurality of structured datapoints. The first profile indicates employee's engagement vis-à-vis the plurality of structured datapoints. The method further comprises creating a second profile of the employee by performing the steps of applying, selecting and assigning. For instance, the method comprises a step of applying a Natural Language Processing (NLP) technique on the plurality of unstructured datapoints. Then, the method further comprises a step of selecting one or more words from each of the plurality of unstructured datapoints by using a prestored vocabulary. Further, the method comprises the step of assigning one or more scores, corresponding to the one or more words, indicating a sentiment level of the employee in context of corresponding each of the plurality of unstructured datapoints. The second profile indicates behaviour of the employee towards the organization. Further, the method comprises generating a matrix of the employee based on the first profile and the second profile such that the matrix comprises a plurality of zones in such a manner that each zone indicates information pertaining to the sentiments comprising satisfaction level and dissatisfaction level of the employee with the organization. Further, the employee is mapped with at least one zone of the plurality of zones.

In one embodiment of the present disclosure, a system for determining sentiment of an employee towards an organization is disclosed. The system comprises an extraction unit configured to extract structured data and unstructured data from one or more structured data sources and one or more unstructured data sources respectively, wherein the one or more structured and unstructured data sources are associated with the organization, and wherein the structured data comprises a plurality of structured datapoints, and wherein the unstructured data comprises a plurality of unstructured datapoints in a textual format. The system further comprises a building unit configured to build a regression model on the plurality of structured datapoints of the structured data in to determine a relationship amongst the plurality of structured datapoints. The system further comprises a first profile creation unit configured to create a first profile of the employee based on the relationship determined amongst the plurality of structured datapoints. The first profile indicates employee's engagement vis-à-vis the plurality of structured datapoints. Further, the system comprises a second profile creation unit configured to create a second profile of the employee by performing the steps of applying, selecting and assigning. For instance, the second profile creation unit applies a natural language processing (NLP) technique on the plurality of unstructured datapoints. Then, the second profile creation unit selects one or more words from each of the plurality of unstructured datapoints by using a prestored vocabulary. Further, the second profile creation unit assigns one or more scores, corresponding to the one or more words, indicating a sentiment level of the employee in context of corresponding each of the plurality of unstructured datapoints. The second profile indicates behaviour of the employee towards the organization. Lastly, the system comprises a matrix generation unit configured to generate a matrix of the employee based on the first profile and the second profile such that the matrix comprises a plurality of zones in such a manner that each zone indicates an information pertaining to the sentiments comprising satisfaction level and dissatisfaction level of the employee towards the organization. Further, the employee is mapped with at least one zone of the plurality of zones.

In one embodiment of the present invention, a non-transitory computer-readable storage medium is disclosed. The medium stored instructions that when processed by a processor cause the system to perform operations. The operations comprise extracting structured data and unstructured data from one or more structured data sources and one or more unstructured data sources respectively. The one or more structured and unstructured data sources are associated with the organization, and the structured data comprise a plurality of structured datapoints, and the unstructured data comprise a plurality of unstructured datapoints in a textual format. The operations further comprise building a regression model on the plurality of structured datapoints of the structured data to determine a relationship of structured datapoints amongst the plurality of structured datapoints. The operations further comprise creating a first profile of the employee based on the relationship determined amongst the plurality of structured datapoints. The first profile indicates employee's engagement vis-à-vis the plurality of structured datapoints. The operations further comprise creating a second profile of the employee by applying a natural language processing (NLP) technique on the plurality of unstructured datapoints, selecting one or more words from each of the plurality of unstructured datapoints by using a prestored vocabulary, and assigning one or more scores, corresponding to the one or more words, indicating a sentiment level of the employee in context of corresponding each of the plurality of unstructured datapoints, wherein the second profile indicates behaviour of the employee towards the organization. The operations further comprise generating a matrix of the employee based on the first profile and the second profile. The matrix comprises a plurality of zones in such a manner that each zone indicates information pertaining to sentiments comprising satisfaction level or dissatisfaction level of the employee towards the organization. Further, the employee is mapped with at least one zone of the plurality of zones.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The embodiments of the disclosure itself, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which.

Figure 1:
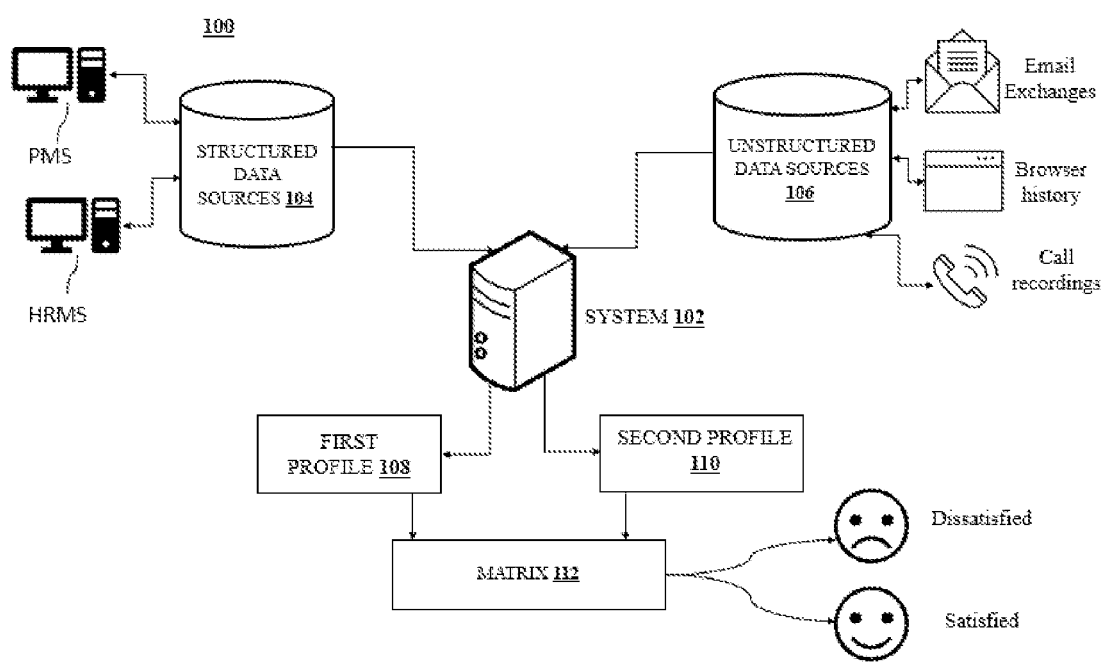
FIG. 1 shows an exemplary environment 100 of determining sentiment of an employee towards an organization, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

The foregoing has broadly outlined the features and technical advantages of the present disclosure in order that the detailed description of the disclosure that follows may be better understood. It should be appreciated by those skilled in the art that the conception and specific embodiment disclosed may be readily utilized as a basis for modifying or designing other structures for carrying out the same purposes of the present disclosure.

The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Disclosed herein is a method and a system for determining sentiment of an employee towards an organization. Mostly, the organizations use standardized data for monitoring the performance of their employees. Such standardized data may include, for example, employee's performance ratings, skills information, timesheet information and the like. However, such standardized data collectively only helps in understanding about how the employee is performing in the organization but not his/her behavioural or sentimental part, for example whether the employee is happy or unhappy or remain anxious towards the organization. This creates a loophole for any organization in understanding the employee's sentiments and taking timely actions for them.

The present disclosure addresses this concern by not only considering the standardized data but also unstructured data available in organization's system or databases. Hence, the present disclosure aims to understand the overall behaviour of the employee from both the perspectives—how they are performing (performance) and how they feel towards the organization (sentiments). The standardized data are generally available in organization's systems or database and may be fetched when required. However, the challenge is to consider the unstructured data mainly related to employee's sentiments towards the organization only. Since human behaviour/sentiments keeps on changing throughout the day due to professional, personal or other reasons, it is important to consider such behavioural part of the employee which are related to organization only and not due to any personal reasons. However, the technical challenge in considering and understanding the organization related behaviour of the employee is selection of appropriate datapoints. The present disclosure addresses this technical challenge by deriving behavioural data (unstructured) only from sources/devices/systems on which the employee is highly likely to express his/her organization related sentiments and not personal or otherwise. According to the embodiments of present disclosure, the unstructured data may be derived from different sources including, but not limited, how the employee expresses his/her emotions while writing official emails or how the employee shares his/her feelings while talking to a colleague or what actually employee browses while using internet. Collective data analysed from both the perspectives helps in understanding employee's sentiments and taking timely actions before the things get worse or out of control.

For example, the system may analyse that an employee who is performing very well (determined from his/her rating—structured data) is not happy with his/her appraisal process (determined from email exchanges—unstructured data) and he/she is also parallelly searching for job on various job portals (determined from browsing history—unstructured data). In such a scenario, the system disclosed in the present disclosure raises this concern to senior authorities (managers, HR heads etc) to take timely actions. The system may also recommend some actions to be taken to settle down the concern of the employee. The upcoming paragraphs of the specification explains how the both the data types (structured and unstructured) are analysed to understand the employee's sentiments and how the actions are generated.

FIG. 1 shows an exemplary environment 100 of a system for identifying sentiments of an employee towards an organization in accordance with an embodiment of the present disclosure. It must be understood to a person skilled in art that the present invention may also be implemented in various environments, other than as shown in FIG. 1.

Referring to FIG. 1, the environment 100 comprises structured data sources 104, unstructured data sources 106 connected with the system 102. It may be understood to a skilled person that both structured data sources 104 and the unstructured data sources 106 may be associated with an organization for which the employees are being tracked. As can be seen from FIG. 1, the structured data sources 104 may comprise, for example, Performance Management System (PMS) and human resource management system (HRMS), whereas the unstructured data sources 106 may comprise, for example, emails, browsers and call recorders running on employee's device. It may be understood to the skilled person that the structured 104 and unstructured data sources 106 as shown in FIG. 1 is merely an example, and the scope of the present disclosure is not limited with them.

The structured data sources 104 may hold structured data which may be used to create a first profile 108 of an employee. Similarly, the unstructured data sources 106 may hold unstructured data which may be used to create a second profile 110 of the employee. The first profile 108 and the second profile 110 of the employee may be further used to create a matrix 112 representing a set of employees' sentimental vs. employee's engagement pattern. The matrix 112 generated may further helps the system 102 to identify sentiments of the employee in a manner as explained in the complete specification. According to embodiments of the present disclosure, the sentiments of the employee may include, but not limited to, satisfaction level or dissatisfaction level of the employee towards the organization. Once the sentiment of the employee is determined, the same may be used for generating recommendations for the employee. The recommendations include various actions to be performed by the supervisors or concerned authorities with respect to satisfaction or dissatisfaction of the employee.

Figure 2:
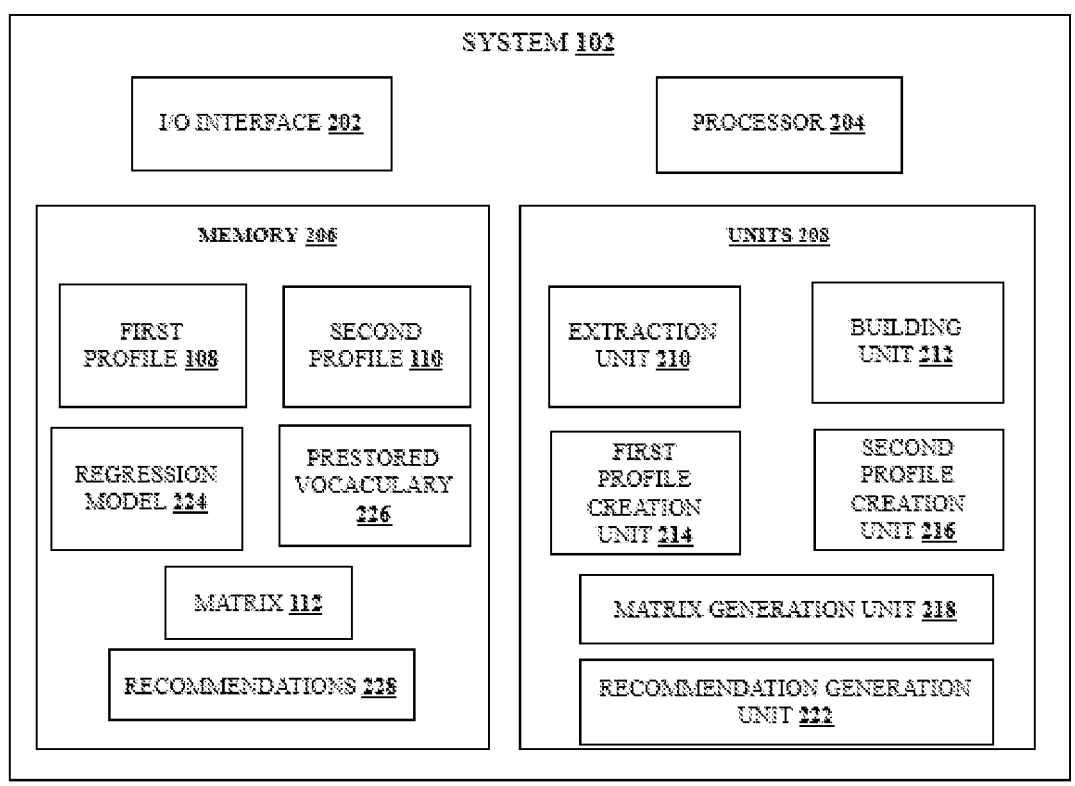
FIG. 2 shows a block diagram 200 of a system for determining sentiment of an employee towards an organization, in accordance with an embodiment of the present disclosure.

The detailed explanation of the exemplary environment 100 is explained in conjunction with FIG. 2 that shows a block diagram of a system 102 for identifying sentiments of an employee towards an organization in accordance with an embodiment of the present disclosure. According to an embodiment of present disclosure, the system 102 may comprise input/output interface 202, a processor 204, a memory 206, and units 208. The I/O interface 202 may include a variety of software and hardware interfaces, for example, a web interface, a graphical user interface, input device, output device and the like. The I/O interface 202 may allow the system 102 to interact with the user directly or through other devices. The memory 206 is communicatively coupled to the processor 204. Further, the memory 206 stores data pertaining to an organization, for example, structured and unstructured data which are explained in the upcoming paragraphs of the specification. The memory 206 may further store the first profile 108, the second profile 110, regression model 224, prestored vocabulary 226, matrix 112 and recommendations 228. Further, the units 208 comprise an extraction unit 210, a building unit 212, a first profile creation unit 214, a second profile creation unit 216, a matrix generation unit 218, and a recommendation generation unit 222. According to embodiments of present disclosure, these units 210-222 may comprise a dedicated hardware component like processor, microprocessor, microcontrollers, circuitries, application-specific integrated circuits for executing the various operations of the system 102. Further, the processor 204 may be capable of collectively performing the operations of the units 210-222 according to the embodiments of the present disclosure. To achieve the objective of the instant invention, various units interact with each other in a manner as explained below.

In the first step, the extraction unit 210 may extract the structured data and unstructured data from one or more structured data sources 104 and one or more unstructured data sources 106 respectively. As discussed above, the structured data sources 104 may include, but not limited to, the Performance Management System (PMS) and the Human Resource Management System (HRMS). The one or more unstructured data sources 106, on the other hand, may include, but not limited to, emails, browsers and call recorders running on the employee's device.

It may be noted that the structured data sources 104 are readily available and may be easily extracted from the structured data sources 104. For example, the PMS (i.e., structured data source) may include structured data related to performance of the employee within the organization. In other words, the structured data sources 104 holds the data which are generally organized or standardized. For example, the structured data may include a plurality of structured datapoints such as "skills data" indicating skill set of the employee, "leaves data" indicating number of leaves available and/or taken by the employee, "timesheet data" indicating break-up of time spent on tasks performed each business day, "compensation data" indicating the employee's salary in relative to average salary as per industry standard, and "performance data" indicating rating computed for an employee based on his/her performance in a specified time range. It may be understood to the skilled person that the aforementioned structured data are reference datapoints and may include additional datapoints also. Therefore, the scope of the present disclosure is not limited to the examples of the structured datapoints discussed above.

The skills data indicate the number and type of skills associated with the employee. The skill may be defined as any technical/behavioural metric that is related to the employee. For example, in an IT services company, the skills may be defined with respect to technologies which is delivered, including Java™, Python™, Android™ Development, etc. Also, the employees within the organization may have one or more primary skills or one or more secondary skills. For example, if the employee has expertise in Java™ and Python™ and is working on a project related to Java™, then such expertise in Java™ is determined as a primary skill. Accordingly, the expertise in Python™ is determined as secondary skill. This identification of the primary and the secondary skills may help in understanding which resource/employee is to be allocated on a specific project requiring niche skill set. For example, if the skill set includes JAVA™ and Python™ and the employee is made to work on projects requiring C++ as one of the skill set, the employee may not be able to perform the tasks assigned to him/her leading to undue delay in the broader timelines of the project.

Similarly, the leave data may include the number of leaves taken by the employee at different time intervals. For example, takes the leave very frequently and consumes the leave quite early, this data may help to understand how the employee remains engaged with the organization.

Similarly, the salary of the employee with average salary of other employees as per industry standard may be compared. The industry standard may be defined as salary of employees working in the same domain, having same level of experience and having similar skills as that of the employee within the organization. For example, the system 102 may continuously gather information from different sources regarding salaries of the employees, for a particular level, in different organizations and store in the memory 206. Using the gathered information, the system 102 may determine the average salary for that level and use same for evaluation how the organization is paying to the employee of similar level. This structured datapoint may be regarded as another aspect for identifying the engagement level of the employee in that if the salary of the employee within the organization is less as compared to the average salary of the other employees as per industrial standards, it may be identified that the employee may not feel happy or engaged with the organization.

The above discussed structured datapoints may be extracted from the structured data sources 104 like human resource management system (HRMS) available with the organizations. The data in the HRMS may be stored in a central server and may be accessible to all the employees within the organization via their handheld device. Another structured data source 104 considered for identifying the sentiment of the employee is Performance management system (PMS). The one or more datapoints present in the PMS are performance review provided by the employee by himself/herself and by his/her mentor. This may include self-review of the employee provided by employee himself/herself. The one or more datapoints may be in the form of numerical point based review system, alphanumeric form of review, textual form of review.

Now, post extracting the structured and unstructured data, in next step, the building unit 212 builds a regression model 224 on the plurality of structured datapoints of the structured data in order to determine a relationship amongst the plurality of structured datapoints.

The regression model 224 defines a relation amongst the plurality of structured datapoints. By way of example, considering the datapoints as performance review of the employee and the number of leaves taken by the employee, a relationship between the performance review of the employee and the number of leaves taken by the employee is built by the building unit 212. Thus, the regression model 224 may indicate that although the employee is a good performer (according to datapoint—performance review of the employee) but takes lot of leaves (according to datapoint—number of leaves taken by the employee). The building unit 212 builds the regression model 224 by calculating skills metric, leaves metric, timesheet metric and compensation metric corresponding to the above discussed skills data, the leaves data, the timesheet data, and the compensation data respectively.

The skill metric may indicate the skill-set of the employee (for example primary skills and the secondary skills) as defined above. Similarly, the leaves metric may indicate the number of leaves taken by the employee in a predetermined amount of time, recency of leaves applied by the employee, frequency of leaves taken by the employee i.e., how frequently the employee is taking leaves. Further, the timesheet metric calculated from the timesheet data indicates how much time the employee is spending on what business/transactional activities. According to embodiments of the present disclosure, the log-in and log-out time may be recorded from the one or more biometric sensors installed within the organization or from login-portal as well. According to other embodiments, the timesheet data may also indicate the break-up of time spent on tasks performed each business day by the employee. The compensation metric, on the other hand, may facilitate to extract the compensation data of the employee indicating salary of the employee. In one embodiment, the compensation data may also indicate the salary of the employee as compared with the industrial standards (as explained above).

The skills metric, the leaves metric, the timesheet metrics and the compensation metric may be further used to calculate engagement metric of the employee. The engagement metric may depict the engagement of the employee with the organization. For example, if based on the skills metric, the leaves metric, the timesheet metric and the compensation metric, it is determined that the user possesses skills which are completely utilized by the organization, takes less leaves, spends appropriate time according to the timesheet data, and is getting salary at par with the industrial standard. The values obtained against these metrics may help the system 102 how the employee is engaged with the organization.

Once the engagement metric is calculated, the system 102 may now calculate performance metric corresponding to the performance data. The performance metric is then correlated with the employee's engagement metric in such a manner that the performance metric is represented as a linear function of the employee's engagement metric i.e.

Performance metric=linear function of (skills metric, leaves metric, timesheet metrics and compensation metric); or Performance metric=linear function of (engagement metric).

In other words, the regression model 224 builds a relationship between the performance metric and the engagement metric depicting the relation between performance of the employee and the engagement of the employee with the organization.

In next step the first profile creation unit 214 may create the first profile 108 of the employee based on the relationship determined amongst the plurality of structured datapoints in above step (relationship between performance metric and engagement metric). The first profile 108 of the employee indicates engagement of the employee vis-à-vis the plurality of structured datapoints. In other words, the first profile 108 of the employee shows how engaged the employee is in the organization. By way of an example, considering the relationship as built by the building unit 212, the first profile 108 of the employee may indicate that the employee is a good performer but takes lot of leaves. Since the employee is a good performer, this may indicate that engagement level of the employee is above average level. Hence, the first profile 108 created helps the system 102 understand about employee's engagement based on the structured data only.

However, the organization also considers the unstructured data which helps in understanding about the employee's sentiments in more detail. As discussed in problem statement above that monitoring the employee only based on their performance level may not give a holistic view of the employee. To overcome this, the present disclosure also focusses on the unstructured data extracted from the unstructured data sources 106 (emails, browsers and call recorders running on employee's device). The unstructured datapoints extracted from the unstructured data sources 106 may comprises email exchange data, browsing data, and call record data.

The email exchange data may include the official emails exchanged between the employees within the organization. In one embodiment, the email exchanges may include email threads, i.e. plurality emails exchanged between a group of employees within the organization. The plurality of emails may relate to a single context. In another embodiment, the email exchanges may include a single email message. The email exchanges are used to identify the sentiments of the profile.

The browsing data may include the data generated when the employee uses one or more internet browser present on the user's handheld device or user's system. The browsing data may relate to job search or kind of query which may help in understanding what exactly the employee may be looking for. The amount of job search data generated by the employee may indicate that the employee is dissatisfied within the organization. In another example, the browsing history may reveal that employee may be looking for joining a new course to upgrade his/her skills. Thus, the browsing data may not only help in identifying the level of satisfaction of the employee within the organization but also the requirement of the employee.

Nowadays every employee has at least one instrument (not shown) on his/her desk for making telephone calls. The instrument may include voice recorders. Also, the employee may use various applications for chatting and calling with the colleagues within the organization. Thus, another example of unstructured data may include the call record data i.e., voice recording of conversation of the employee within the organization. The voice recordings may be also considered one of the factor for understanding the employee's sentiments. In one embodiment, the voice of the employee recorded from the instrument may be converted into textual format using one or more known techniques, for example speech-to-text convertors.

Similar to the first profile 108 creation using the structured data, a second profile 110 of the employee is also created, by using the unstructured data, by the second profile creation unit 216, which explained in below paragraphs.

Since most of the unstructured data extracted by the extraction unit 210 from unstructured data source 106 are in textual format as the unstructured data is being extracted by the speech-to-text convertors mentioned above, the second profile creation unit 216 may apply a Natural Language Processing (NLP) technique on the unstructured data points. According to embodiments of present disclosure, one or more words may be selected from each of the unstructured datapoints (email exchange data, browsing data, and call record data) using a prestored vocabulary 252.

According to an embodiment, the prestored vocabulary 252 may include a set of words in textual format which helps in analyzing the words selected from the email exchange data, browsing data, and call record data. For example, the selected words may be compared with the words present in the prestored vocabulary so as to identify their contextual meanings. The prestored vocabulary may categorize the words into positive words or negative words, i.e., the words conveying positive sentiments are categorized as positive words, whereas the words conveying negative sentiments are assignment negative words.

Now once the words are selected from the different datapoints (email data, browsing data and call recording), the next step is to assign scores to the words to understand the sentiment of the employee. Considering an example of "email exchanges" as unstructured datapoint, the manner of assigning score is depicted in below paragraphs.

For a whole email to be considered as conveying positive sentiments, the number of words conveying positive sentiments are compared with the total number of words in the email exchange and an overall score is identified. Thus, if:

Number of words conveying positive score/total number of words in email exchange*100 >95%, the email is regarded as a positive email exchange, otherwise it is regarded as negative email exchange.

The value "95%" has been taken only as an example and indicates a threshold value, therefore should be considered for limiting the scope of the present disclosure. This is a predefined threshold value and may be prestored in the memory 206.

Thus, the overall positive score assigned to the email exchange may indicate the behaviour/sentiment of the employee within the organization.

By way of example, considering email exchanges as one example of unstructured datapoints, the email exchange may look like one illustrated below. The bold and underline indicates the words selected using the prestored vocabulary "This is an ideal career launch platform for me. I have had a diverse experience over the past 1 year. My boss has guided me in multiple tracks and I will take this learning into FY21. In FY21, I also want to get involved in more Sales oriented tracks to facilitate my shift to Sales eventually as the current role tenure ends."

The above email exchange may be email sent by the employee to his mentor/supervisor within the organization. The second profile creation unit 216 may identify one or more words using the NLP techniques as explained above. The one or more words identified corresponds to one or more meaning and are identified after comparing it with prestored vocabulary 226.

Thus, in the above example of email exchange, the words identified by the second profile creation unit 216 may select the words highlighted in bold and underline i.e., "ideal", "launch", "diverse", "guided", and "learning". Each of the selected words are assigned scores. For example, the scores may be assigned based on the positive sentiments or negative sentiments, as explained above. Hence, the words like idea, launch, diverse, guided may be regarded as positive words since they convey positive sentiments. Thus, a positive score is assigned to these words.

Thus, the overall positive score assigned to the email exchange may indicate the behaviour/sentiment of the employee within the organization.

Similar method of assigning scores is applicable to other unstructured datapoints i.e., browsing data and call recording data.

Most of the prior art techniques known in the art used for identifying the sentiments of the employee within an organization do not consider the unstructured data sources. These unstructured data sources are considered to be of at most importance in creating the holistic 360 degree view of the sentiments of the employee towards the organization.

Thus, to create the above discussed 360 degree view of sentiments of the employee, both the first profile 108 and the second profile 110 are considered. Thus, in next step, the matrix generation unit 216 may generate a matrix 112 of the employee based on the first profile 108 and the second profile 110 In one embodiment, the matrix 112 may be created by plotting the first profile 108 and the second profile 110 together in form of graphical representation. In another embodiment, a first score may be assigned to the first profile 108 and a second score may be assigned to the second profile 110 and an average of the first score and the second score may be calculated. The matrix 112 may then be created based on the average of the first score and the second score. In yet another embodiment, the overall score from the first profile 108 and the second profile 110 may be generated based on a pre-defined formula. The overall score may then be used to create the matrix 112.

According to an embodiment, the matrix 112 generated may comprise a plurality of zones in such a manner that each zone indicates an information pertaining to the sentiment of the employee, for example satisfaction level or dissatisfaction level of the employee towards the organization. Using the generated matrix 112, the system 102 maps the employee with at least one zone of the plurality of zones, which is explained in upcoming paragraphs.

According to embodiments of the present disclosure, the matrix 112 may categorize the employee in at least one of the 9 zones, where each zone indicates level of satisfaction of the employee. For example, each of the zone may define the following:

Zone 1—Very Low Satisfaction Level
Zone 2, 4—Low Satisfaction Level
Zone 5—Moderate Satisfaction Level
Zone 7, 8—High Satisfaction Level from second profile (unstructured data), but not from first profile (structured data).
Zone 3, 6—High Satisfaction Level from the first profile (structured data), but not from first profile (unstructured data).
Zone 9—High Satisfaction Level.

The above 9 zones and the definition of each zone is merely for illustration purpose and is not limited to the one defined here.

Once the employee is mapped with at least one zone, in next step, the recommendation generation unit 222 may generate recommendation for the employee based on the zone mapped with the employee. The recommendation may comprise, for example, providing rewards to the employee, providing feedback to the employee, and providing a set of behavioural actions for the employee.

Thus, for example, if the employee has been mapped in zone 3 or zone 6 i.e., the employee is a good performance employee but is unsatisfied with the project he/she is working in (identified from email exchanges of the employee with his mentor/supervisor), the supervisor or mentor may get in touch with the employee regarding the change of project.

Similarly, if the employee falls in zone 7 or 8, i.e., employee is satisfied with the organization (as identified from email exchanges, call records and browsing history), but is unsatisfied with the salary being offered to him/her, the supervisor or mentor of the employee may get in touch with the employee regarding salary talks and may consider increasing the salary of the employee.

Thus, in this manner, the satisfaction of the employee may be achieved to help creating a win-win situation for both the employee and the employer.

Figure 3:
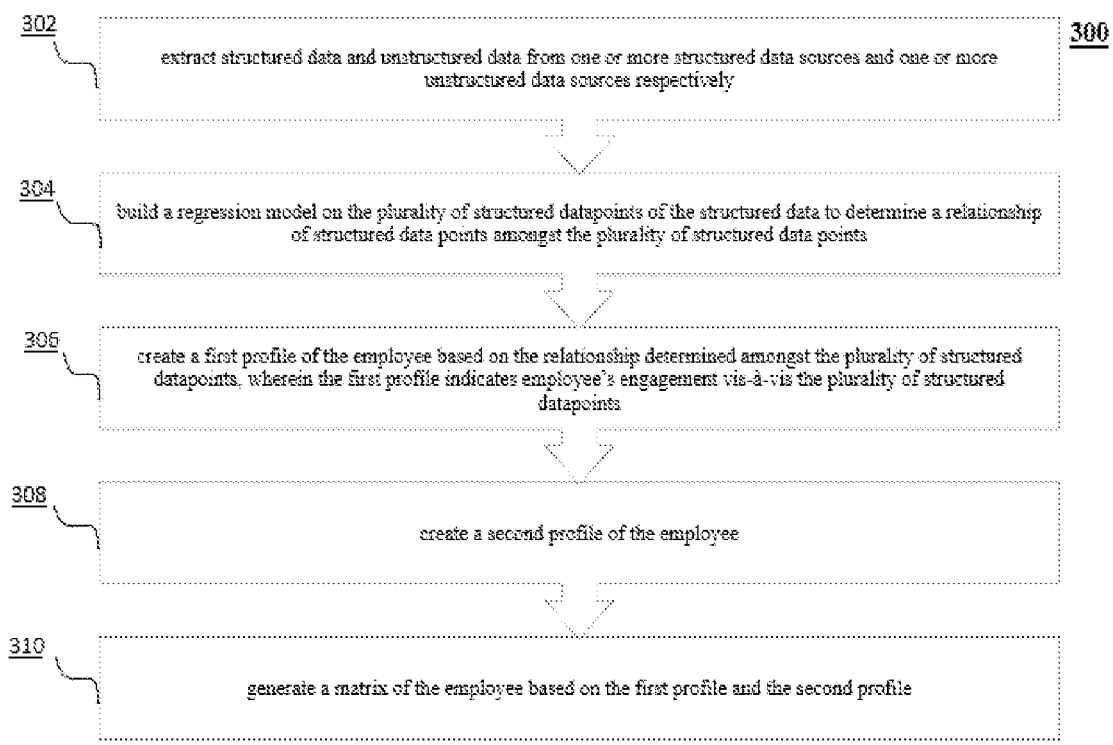
FIG. 3 shows a method 300 of determining sentiment of an employee towards an organization, in accordance with an embodiment of the present disclosure.

The above method for identifying sentiments of the employee towards the organization is explained with the help of FIG. 3.

As illustrated in FIGS. 3, the method 300 includes one or more blocks illustrating a method for identifying sentiments of the employee comprising satisfaction or dissatisfaction of the employee towards the organization. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein.

At block 302, the method 300 comprises extracting structured data and unstructured data from one or more structured data sources 104 and one or more unstructured data sources 106 respectively. The one or more structured source 104 and unstructured data sources 106 are associated with the organization. Further, the structured data comprise a plurality of structured datapoints, and the unstructured data comprise a plurality of unstructured datapoints in a textual format. The structured datapoints may comprise skills data indicating skill-set associated with the employee, leaves data indicating number of leaves taken by the employee, timesheet data indicating break-up of time spent on tasks performed each business day, compensation data indicating the employee's salary in relative to average salary as per industry standard, and performance data indicating information pertaining to performance of the employee being provided by the employee himself/herself and by the employee's mentor. Similarly, the plurality of unstructured datapoints may comprise for example, email exchange data, browsing data, and call record data.

At block 304, the method 300 comprises building a regression model 224 on the plurality of structured datapoints of the structured data to determine a relationship of structured datapoints amongst the plurality of structured datapoints.

At block 306, the method 300 comprises creating a first profile 108 of the employee based on the relationship determined amongst the plurality of structured datapoints, wherein the first profile 108 indicates employee's engagement vis-à-vis the plurality of structured datapoints.

At block 308, the method 300 comprises creating a second profile 110 of the employee by: applying a natural language processing (NLP) technique on the plurality of unstructured datapoints, selecting one or more words from each of the plurality of unstructured datapoints by using a prestored vocabulary, and assigning one or more scores, corresponding to the one or more words, indicating a sentiment level of the employee in context of corresponding each of the plurality of unstructured datapoints, wherein the second profile indicates behaviour of the employee within the organization At block 310, the method 300 comprises generating a matrix 112 of the employee based on the first profile 108 and the second profile 110 wherein the matrix 112 comprises a plurality of zones in such a manner that each zone indicates an information pertaining to sentiments comprising satisfaction or dissatisfaction of the employee with the organization, and wherein the employee is mapped with at least one zone of the plurality of zones.

Computer System

Figure 4:
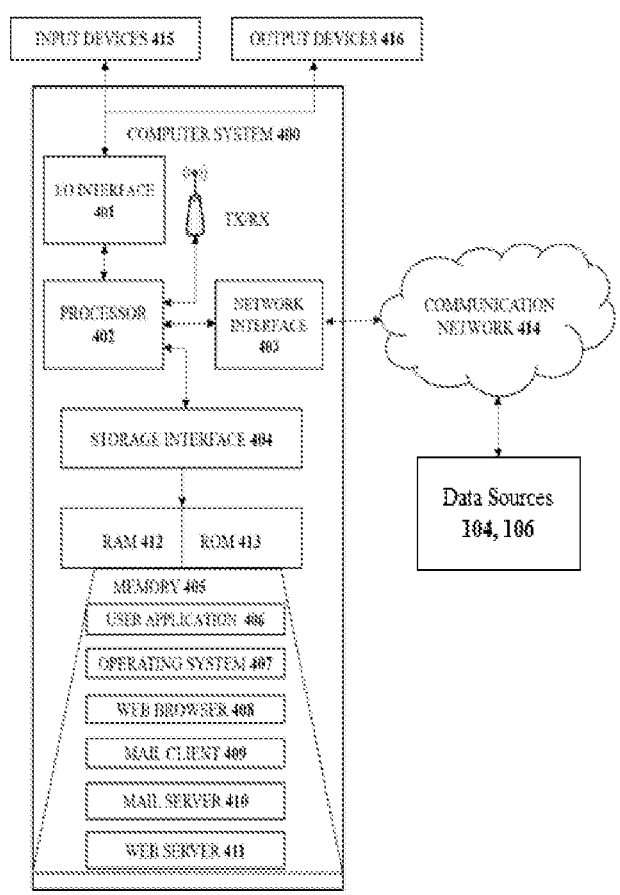
FIG. 4 shows a block diagram of an exemplary computer system 400 for implementing the embodiments consistent with the present disclosure.

FIG. 4 illustrates a block diagram of an exemplary computer system 400 for implementing embodiments consistent with the present disclosure. In an embodiment, the computer system 400 may be a peripheral device, which is used for facilitating systematic escalation of information related to an event in an organizational hierarchy. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n /b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface, the computer system 400 may communicate with one or more I/O devices.

In some embodiments, the processor 402 may be disposed in communication with a communication network 414 via a network interface 403. The network interface 403 may communicate with the communication network 414. The communication unit may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 414 can be implemented as one of the several types of networks, such as intranet or Local Area Network (LAN) and such within the organization. The communication network 414 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 414 may include a variety of network devices, including routers, bridges, servers, computing devices, storage devices, etc.

In some embodiments, the processor 402 may be disposed in communication with a memory 405 (e.g., RAM 412, ROM 413, etc. as shown in FIG. 4) via a storage interface 404. The storage interface 404 may connect to the memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application, an operating system, a web browser, mail client, mail server, web server and the like. In some embodiments, computer system may store user/application data, such as the data, variables, records, etc. as described in this invention. Such databases may be implemented as fault-tolerant, relational, scalable, secure databases such as OracleR or SybaseR.

The operating system may facilitate resource management and operation of the computer system. Examples of operating systems include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system, such as cursors, icons, check boxes, menus, windows, widgets, etc. Graphical User Interfaces (GUIs) may be employed, including, without limitation, APPLE MACINTOSHR operating systems, IBM™ OS/2, MICROSOFT™ WINDOWS™ (XP™, VISTA™/7/8, 10 etc.), UnixR X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCE NUMERALS

| Reference Numeral | Description |
|---|---|
| 100 | Environment |
| 102 | System |
| 104 | One or more structured data sources |
| 106 | One or more unstructured data sources |
| 108 | First profile |
| 110 | Second profile |
| 112 | Matrix |
| 202 | I/O interface |
| 204 | Processor |
| 206 | Memory |
| 208 | Units |
| 210 | Extraction unit |
| 212 | Building unit |
| 214 | First profile creation unit |
| 216 | Second profile creation unit |
| 218 | Matrix generation unit |
| 222 | Recommendation generation unit |
| 224 | Regression model |
| 226 | Prestored vocabulary |
| 228 | Recommendation |
| 300 | Method |
| 302-310 | Method steps |
| 400 | Exemplary Computer System |
| 401 | I/O Interface of The Exemplary Computer System |
| 402 | Processor of The Exemplary Computer System |
| 403 | Network Interface |
| 404 | Storage Interface |
| 405 | Memory of The Exemplary Computer System |
| 406 | User/Application |
| 407 | Operating System |
| 408 | Web Browser |
| 409 | Communication Network |
| 410 | Database Update |
| 411 | Input Devices |
| 412 | Output Devices |
| 413 | RAM |
| 414 | ROM |
| 415 | Mail Client |
| 416 | Mail Server |
| 417 | Web Server |

The invention claimed is:

1. A method for determining sentiment of an employee towards an organization, the method comprising:
extracting structured data and unstructured data from one or more structured data sources and one or more unstructured data sources respectively, wherein the one or more structured and unstructured data sources are associated with the organization, and wherein the structured data comprise a plurality of structured datapoints, and wherein the unstructured data comprise a plurality of unstructured datapoints in a textual format;
building a regression model on the plurality of structured datapoints of the structured data to determine a relationship of structured datapoints amongst the plurality of structured datapoints, wherein the regression model is built by:
calculating skills metric, leaves metric, timesheet metric and compensation metric corresponding to skills data, leaves data, timesheet data, and compensation data respectively,
calculating employee's engagement metric based on the skills metric, the leaves metric, the timesheet metric and the compensation metric, and
calculating performance metric corresponding to the performance data; and
correlating the employee's engagement metric with the performance metric in such a manner that the performance metric is represented as a linear function of the employee's engagement metric;
creating a first profile of the employee based on the relationship determined amongst the plurality of structured datapoints, wherein the first profile indicates employee's engagement vis-à-vis the plurality of structured datapoints;
creating a second profile of the employee by:
applying a natural language processing (NLP) technique on the plurality of unstructured datapoints,
selecting one or more words from each of the plurality of unstructured datapoints by using a prestored vocabulary, and
assigning one or more scores, corresponding to the one or more words, indicating a sentiment level of the employee in context of corresponding each of the plurality of unstructured datapoints, wherein the second profile indicates behaviour of the employee towards the organization; and
generating a matrix of the employee based on the first profile and the second profile, wherein the matrix comprises a plurality of zones in such a manner that each zone indicates information pertaining to sentiments comprising satisfaction level or dissatisfaction level of the employee towards the organization, and wherein the employee is mapped with at least one zone of the plurality of zones.

2. The method as claimed in claim 1, wherein the one or more structured data sources comprises at least one of a performance management system and human resource management system, and wherein the one or more unstructured data sources comprises at least one of emails, browsers and call recorders running on employee's device.

3. The method as claimed in claim 1, wherein the plurality of structured datapoints comprises at least one of the skills data indicating number and type of skills associated with the employee, the leaves data indicating number of leaves taken by the employee, the timesheet data indicating punctuality of the employee, the compensation data indicating the employee's salary in relative to average salary as per industry standard, and the performance data indicating information pertaining to performance of the employee being provided by the employee himself/herself and by the employee's mentor; and wherein the plurality of unstructured datapoints comprises at least one of email exchange data, browsing data, and call record data.

4. The method as claimed in claim 1, further comprising:
generating a recommendation for the employee based on the at least one zone mapped with the employee, wherein the recommendation comprises at least one of providing rewards to the employee, providing feedback to the employee, and providing a set of behavioral actions for the employee.

5. The method as claimed in claim 1, wherein the performance metric is computed based on linear function of either the skills metric, the leaves metric, the timesheet metrics and the compensation metric or the engagement metric.

6. The method as claimed in claim 1, wherein the first profile is created based on the relationship between the performance metric and the employee's engagement metric.

7. A system for determining sentiment of an employee towards an organization, the system comprises:
a processor, and
a memory storing instructions which when executed cause the processor to:
extract structured data and unstructured data from one or more structured data sources and one or more unstructured data sources respectively, wherein the one or more structured and unstructured data sources are associated with the organization, and wherein the structured data comprises a plurality of structured datapoints, and wherein the unstructured data comprises a plurality of unstructured datapoints in a textual format;
build a regression model on the plurality of structured datapoints of the structured data in to determine a relationship of structured datapoints amongst the plurality of structured datapoints, wherein the regression model is built by:
calculating skills metric, leaves metric, timesheet metric and compensation metric corresponding to skills data, leaves data, timesheet data, and compensation data respectively,
calculating employee's engagement metric based on the skills metric, the leaves metric, the timesheet metric and the compensation metric,
calculating performance metric corresponding to the performance data; and
correlating the employee's engagement metric with the performance metric in such a manner that the performance metric is represented as a linear function of the employee's engagement metric;
create a first profile of the employee based on the relationship determined amongst the plurality of structured datapoints, wherein the first profile indicates employee's engagement vis-à-vis the plurality of structured datapoints;
create a second profile of the employee by:
applying a natural language processing (NLP) technique on the plurality of unstructured datapoints,
selecting one or more words from each of the plurality of unstructured datapoints by using a prestored vocabulary, and
assigning one or more scores, corresponding to the one or more words,
indicating a sentiment level of the employee in context of corresponding each of the plurality of unstructured datapoints, wherein the second profile indicates behaviour of the employee towards the organization; and
generate a matrix of the employee based on the first profile and the second profile, wherein the matrix comprises a plurality of zones in such a manner that each zone indicates information pertaining to the sentiments comprising satisfaction level or dissatisfaction level of the employee with the organization, and wherein the employee is mapped with at least one zone of the plurality of zones.

8. The system as claimed in claim 7, wherein the one or more structured data sources comprises at least one of a performance management system and human resource management system, and wherein the one or more unstructured data sources comprises at least one of emails, browsers and call recorders running on employee's device.

9. The system as claimed in claim 7, wherein the plurality of structured datapoints comprises at least one of the skills data indicating number and type of skills associated with the employee, the leaves data indicating number of leaves taken by the employee, the timesheet data indicating punctuality of the employee, the compensation data indicating the employee's salary in relative to average salary as per industry standard, and the performance data indicating information pertaining to performance of the employee being provided by the employee himself/herself and by the employee's mentor; and wherein the plurality of unstructured datapoints comprises at least one of email exchange data, browsing data, and call record data.

10. The system as claimed in claim 7, further
generates a recommendation for the employee based on the at least one zone mapped with the employee, wherein the recommendation comprises at least one of providing rewards to the employee, providing feedback to the employee, and providing a set of behavioral actions for the employee.

11. The system as claimed in claim 7, wherein the performance metric is computed based on linear function of either the skills metric, the leaves metric, the timesheet metrics and the compensation metric or the engagement metric.

12. A non-transitory computer-readable storage medium including instructions stored thereon that when processed by a processor cause the system to perform operations comprising:
extracting structured data and unstructured data from one or more structured data sources and one or more unstructured data sources respectively, wherein the one or more structured and unstructured data sources are associated with the organization, and wherein the structured data comprise a plurality of structured datapoints, and wherein the unstructured data comprise a plurality of unstructured datapoints in a textual format;
building a regression model on the plurality of structured datapoints of the structured data to determine a relationship of structured datapoints amongst the plurality of structured datapoints, wherein the regression model is built by,
calculating skills metric, leaves metric, timesheet metric and compensation metric corresponding to the skills data, the leaves data, the timesheet data, and the compensation data respectively,
calculating employee's engagement metric based on the skills metric, the leaves metric, the timesheet metric and the compensation metric, calculating performance metric corresponding to the performance data; and correlating the employee's engagement metric with the performance metric in such a manner that the performance metric is represented as a linear function of the employee's engagement metric;

creating a first profile of the employee based on the relationship determined amongst the plurality of structured datapoints, wherein the first profile indicates employee's engagement vis-à-vis the plurality of structured datapoints;

creating a second profile of the employee by:
applying a natural language processing (NLP) technique on the plurality of unstructured datapoints,
selecting one or more words from each of the plurality of unstructured datapoints by using a prestored vocabulary, and
assigning one or more scores, corresponding to the one or more words, indicating a sentiment level of the employee in context of corresponding each of the plurality of unstructured datapoints, wherein the second profile indicates behaviour of the employee towards the organization; and generating a matrix of the employee based on the first profile and the second profile, wherein the matrix comprises a plurality of zones in such a manner that each zone indicates information pertaining to sentiments comprising satisfaction level or dissatisfaction level of the employee towards the organization, and wherein the employee is mapped with at least one zone of the plurality of zones.

13. The medium as claimed in claim 12, wherein the one or more structured data sources comprises at least one of a performance management system and human resource management system, and wherein the one or more unstructured data sources comprises at least one of emails, browsers and call recorders running on employee's device.

14. The medium as claimed in claim 12, wherein the plurality of structured datapoints comprises at least one of skills data indicating number and type of skills associated with the employee, leaves data indicating number of leaves taken by the employee, timesheet data indicating punctuality of the employee, compensation data indicating the employee's salary in relative to average salary as per industry standard, and performance data indicating information pertaining to performance of the employee being provided by the employee himself/herself and by the employee's mentor; and wherein the plurality of unstructured datapoints comprises at least one of email exchange data, browsing data, and call record data.

15. The medium as claimed in claim 12, further comprising instructions to:

generate a recommendation for the employee based on the at least one zone mapped with the employee, wherein the recommendation comprises at least one of providing rewards to the employee, providing feedback to the employee, and providing a set of behavioral actions for the employee.

16. The medium as claimed in claim 12, wherein the performance metric is computed based on linear function of either the skills metric, the leaves metric, the timesheet metrics and the compensation metric or the engagement metric.

\* \* \* \* \*